July 28, 1942.  A. J. MUSSELMAN  2,291,485
TWO-SPEED CONTROL
Filed Jan. 22, 1941  2 Sheets-Sheet 1

INVENTOR.
ALVIN J. MUSSELMAN
BY Kwis Hudson & Kent
ATTORNEYS

July 28, 1942.  A. J. MUSSELMAN  2,291,485
TWO-SPEED CONTROL
Filed Jan. 22, 1941  2 Sheets-Sheet 2
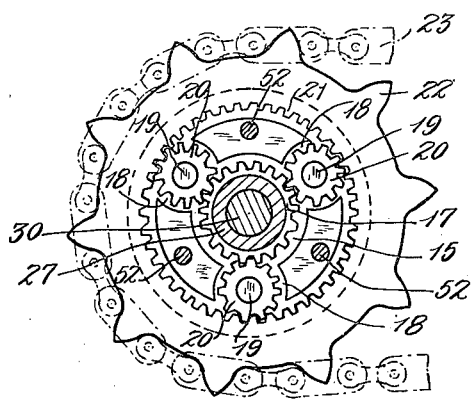
Fig. 6
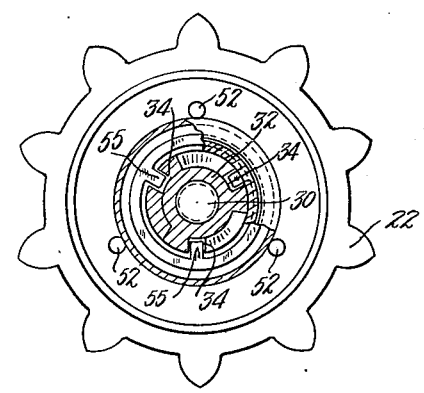
Fig. 7
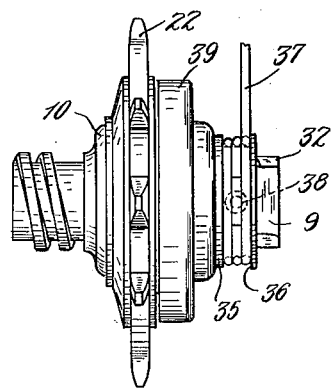
Fig. 8
Fig. 5
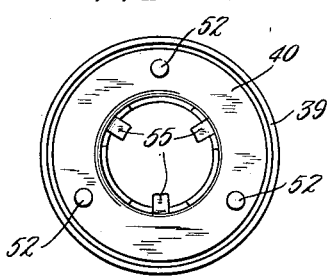
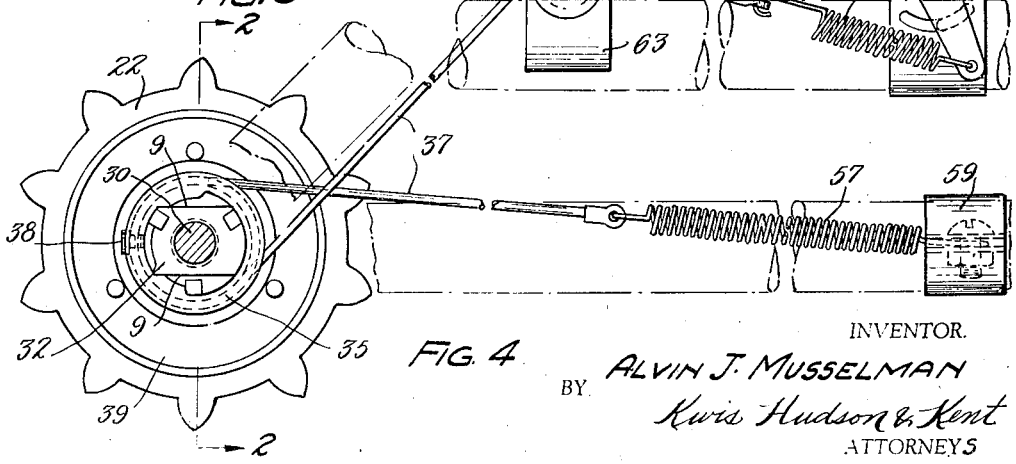
Fig. 4
INVENTOR.
ALVIN J. MUSSELMAN
BY Kwis Hudson & Kent
ATTORNEYS Patented July 28, 1942

2,291,485

UNITED STATES PATENT OFFICE 2,291,485

TWO-SPEED CONTROL

Alvin J. Musselman, Cleveland Heights, Ohio

Application January 22, 1941, Serial No. 375,466

10 Claims. (Cl. 74—290)

This invention relates to improvements in two-speed controls for bicycles. As illustrated herein it is applied to a two-speed coaster brake construction, but in some of its broader aspects it is adaptable to somewhat more general application.

One of the objects of the invention is the provision of simple, convenient and effective means for shifting from direct drive to planetary drive and vice versa in a planetary gear transmission.

Another object is the provision of screw means for operating a shifter member together with manually controlled means for rotating the screw means in opposite directions.

A further object is the provision of means for presetting tension means to bring about a quick or snap action of the shifter to become effective at certain predetermined points in the rotation of the driver.

Still another object is the provision of novel cable connections for operating the shifter.

Other objects and features of novelty will appear as I proceed with the description of that embodiment of the invention which, for the purposes of the present application, I have illustrated in the accompanying drawings, in which Fig. 1 is a side view of a bicycle showing cable connections which may be employed in the operation of my improved control.

Fig. 4 is a fragmental view on a larger scale than Fig. 1 illustrating the control cable connections.

Fig. 5 is a detail view of the rear side of the shifter member.

Figure 2:
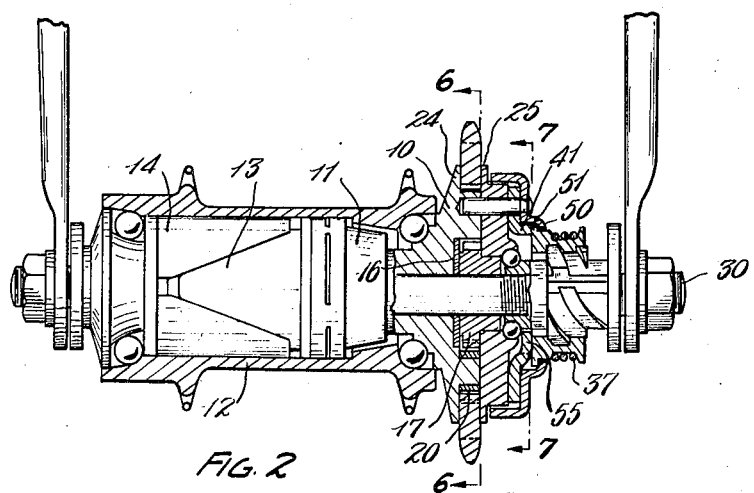
Fig. 2 is an elevational view, partly in section, of a bicycle rear hub with planetary transmission and my novel gear shifting means, the gearing being shown in high speed or direct drive relation.

Figs. 6 and 7 are sectional views taken substantially on the lines 6—6 and 7—7 of Fig. 2.

Fig. 8 is an elavational view of the two-speed unit including gear shifting mechanism.

The present invention has to do with control means or gear shifting means for planetary transmissions on bicycles, particularly where applied to coaster brakes, as in Lee Patent 2,182,025. The invention here is not concerned directly with the details of the coaster brake or with the two-speed transmission, but the particular equipment herein disclosed was designed for use upon the Lee patent construction and hence it is convenient to illustrate it as applied to that construction. The control when in one position locks the sun gear and the planet gear carrier together, causing all of the transmission parts to revolve as a unit to produce direct drive or high speed, while when the control is in its other position it serves to hold the sun gear stationary, the other parts of the transmission functioning to produce low speed drive.

Figure 3:
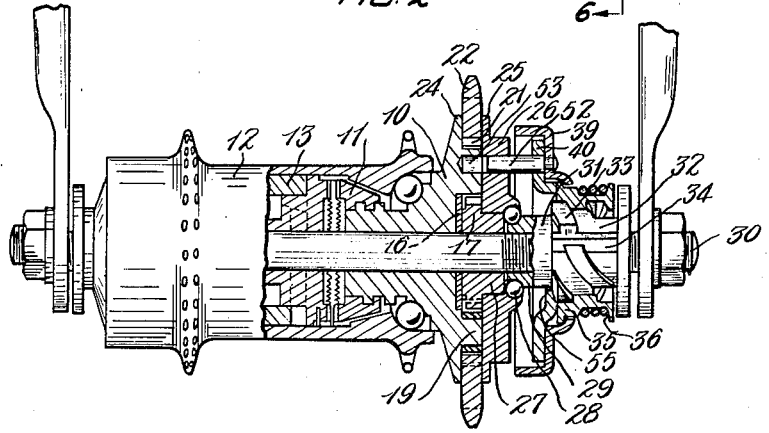
Fig. 3 is a similar view, the gearing being shown in position to make the planetary transmission effective.

In the drawings the numeral 10 represents a driver screw or driver associated with the rear wheel hub of a bicycle and adapted to receive force applied through the usual pedals and chain. This driver is substituted for the driver screw of a coaster brake when conversion is made from a single speed coaster brake to a two-speed coaster brake. It performs the usual functions of the driver screw, that is to move a collar 11 into gripping relation to the wheel hub 12 when the pedals are operated forwardly to permit the hub to carry the collar 11 out of gripping relation with the hub and leave the latter free for coasting when the pedals are stopped, and when the rider back-pedals to force the collar 11 to the left in Fig. 3, shifting the wedge 13 to expand the sleeve 14 and cause it to engage the inner surface of the hub to produce braking effect. In addition the driver 10 constitutes the planet carrier of the two-speed unit, the latter being illustrated separately in Fig. 8.

The driver 10 on its outer face has a central circular recess 15 in which is received a washer 16 and a sun gear 17. In addition there are three other circular recesses 18 of smaller size which merge with the recess 15, and at the center of each recess 18 there is a circular boss 19 upon which is journalled a planet pinion 20 which meshes with sun gear 17. These three planet pinions mesh with an internal gear 21 that is formed in a sprocket ring 22 over which runs the usual driving chain 23. This sprocket ring is supported in its own plane by the three planet gears. It has lateral support on one side by a radial flange 24 on the driver 10. Lateral support on its opposite side is supplied by a similar flange 25 on a disk 26 that is forced onto a hub extension 27 of sun gear 17. These two parts, that is hub 27 and disk 26, function as though they were integral.

In the disk 26 there is formed a raceway for a ball bearing 28. The other element of this ball bearing consists of a cone 29 that is threaded onto the axle 30 and is thus an adjusting cone. In order to facilitate adjustment of the cone the outer end thereof is formed with a pair of parallel flat surfaces 9 for the reception of a wrench. When the hub is mounted in the frame of the bicycle and the nuts on the ends of the axle are tightened this cone 29 is rigidly fixed in place. It comprises a part 31 of small diameter in which is formed the ball race and a part 32 of larger diameter in which is formed a spiral thread 33 of steep pitch and three longitudinally extending grooves 34. Cooperating with this externally threaded element 32 there is an internally threaded element 35 which, when rotated, is screwed either inwardly or outwardly, that is toward or away from the driver 10. The outer portion of the internally threaded element is formed as a sheave 36 to take a cable 37 which is wound around the shaft, preferably several times, and is fastened thereto at one point as by a rivet 38, Fig. 8.

The internally threaded element 35, when it is screwed inwardly or outwardly, serves as an actuator for a gear shifter, the latter comprising an outer annular part 39 and an inner annular part 40 welded or otherwise secured together. Part 40 has an outwardly extending flange 41 at its inner periphery, and part 39 also has an outwardly extending flange with an inturned lip 50 spaced from flange 41 far enough to permit a short flange 51 on the internally threaded element 35 to be loosely received between them, whereby the element 35 and the shifter member 39, 40 are interconnected in such manner as to prevent relative movement axially while permitting relative rotation.

The shifter member 39, 40 carries a plurality of pins 52, preferably three in number, which extend inwardly through holes in the disk 26 and at times into holes 53 in the planet carrier. When the element 35 is screwed inwardly as far as it will go the pins 52 extend into the holes 53, as illustrated in Fig. 2, and the sun gear is locked to the planet carrier. When the element 35 is threaded outwardly the pins 52 are withdrawn from the holes 53, leaving the planet carrier free to revolve around the sun gear.

In addition to the pins 52 the part 40 of the shifter member has three inwardly extending lugs 55 that are adapted to enter the grooves 34. When the transmission is in direct drive or high speed relation, as illustrated in Fig. 2, these lugs are entirely out of the grooves 34 and hence the shifter is free to rotate with the parts of the planetary transmission. When however the shifter is moved to the right, as in Fig. 3, to bring the planetary transmission into operation the lugs 55 are in the grooves 34, the shifter is thereby locked against rotation and the pins 52 on the shifter in turn lock the disk 26 and the sun gear 17 against rotation, whereupon the sprocket ring 22 rotates the pinions 20 around the bosses 19 and the pinions 20 run upon the stationary sun gear 17 thereby revolving the planet gear carrier and the driver 10 at a rate of speed slower than that of the sprocket ring.

In order to shift the gears the internally threaded element 35 must be rotated. In the embodiment illustrated this is accomplished by means of a cable 37. Obviously the rider controls might be so arranged as to enable the rider to exert a pull directly upon either end of the cable. I prefer however to exert the necessary pull in either direction by means of springs which effect a sudden or snap action, thereby eliminating the possibility of the mechanism halting in an intermediate position. To this end the two extremities of the cable are connected with coil springs 57 and 58. The opposite end of spring 57 is attached to a lower fork stay of the bicycle by a clamp 59, and the forward end of spring 58 is attached to the short arm of a bellcrank lever 60 pivotally mounted on a bracket 61 which is attached to the top bar of the bicycle frame within easy reach of the bicycle rider. Spring 58 is stiffer than spring 57. The long end of the cable which runs to the spring 58 is carried up over a guide wheel 62 that is mounted upon a small bracket 63 attached to the upper bar of the bicycle frame near the seat post.

In assembling the controls upon a bicycle the brackets 61 and 63 are mounted in the positions desired, substantially as shown in the drawings. Both the short end and the long end of the cable are given at least one turn around the shaft 36 and the long end is carried up over guide pulley 62 and secured to spring 58. The short end of the cable is attached to spring 57 and the bracket 59 is adjusted so as to cause the cable to rotate the element 35 clockwise as far as it will go and put the spring 57 under a predetermined tension. Then with the lever 60 in its forward position the bracket 61 is adjusted forwardly to put spring 58 under sufficient tension to take up any slack.

Figure 1:
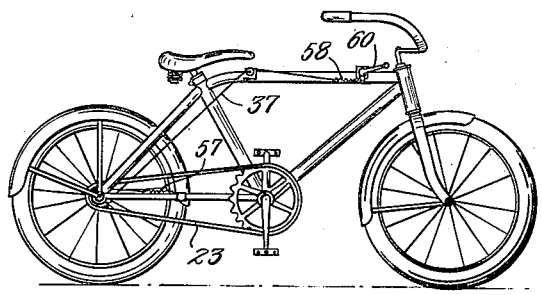

Now, with the transmission in high as indicated in Fig. 2, when the lever 60 is pulled back from the position of Fig. 1 to that of Fig. 4 spring 58 will be placed under strong tension tending to pull the long end of the cable 37 forward. This will tend to rotate element 35 counterclockwise. But this rotation cannot take place immediately because the lugs 55 will not ordinarily be in register with the grooves 34. As soon as the driver 10 carries the transmission parts around the necessary part of a revolution the lugs 55 and the grooves will come into register and then the tension on the spring 58 will quickly impart to the cable the force previously stored up in the spring and the element 35 will be screwed outwardly upon the element 32 with a snap action, pulling the pins 52 out of the holes 53 and changing the transmission into low speed relation. At the same time a pull is exerted on the short end of the cable and spring 57 is placed under tension.

Now, when it is desired to change back into high speed or direct drive the rider shifts lever 60 to the Fig. 1 position, relieving spring 58 of most of its tension and tending to enable spring 57 to exert a pull on the cable to turn the element 35 in the clockwise direction. The element 35 does not respond immediately however because the pins 52 will not ordinarily be in register with the holes 53 in the planet carrier. Consequently the planet carrier will have to be rotated far enough to bring about such registration, whereupon the pins will enter the holes and the element 35 will be screwed inwardly to move the shifter back to the position of Fig. 2, when the transmission will again be in high.

Variations from the described structure may be employed. Accordingly I desire it to be understood that the scope of the invention is to be regarded as defined exclusively by the appended claims rather than by the foregoing description or the accompanying illustration.

Having thus described my invention, I claim:

1. In two-speed gear mechanism for bicycles, an axle, an axially movable shifter acting in one position to hold the gearing in low speed relation and in another position to hold it in high speed relation, screw means comprising an externally threaded element fixed upon the axle and an internally threaded element cooperating therewith, said shifter and said internally threaded element being connected together to prevent relative movement axially and to permit relative rotation, and manually actuated means for imparting rotation to said internally threaded element.

2. In two-speed gear mechanism for bicycles, an axle, an axially movable shifter acting in one position to hold the gearing in low speed relation and in another position to hold it in high speed relation, screw means comprising an externally threaded element fixed upon the axle and an internally threaded element cooperating therewith, said shifter and said internally threaded element being connected together to prevent relative movement axially and to permit relative rotation, said internally threaded element having a sheave for the reception of a cable by means of which the internally threaded element may be rotated upon the fixed threaded element to effect movement of said shifter.

3. In two-speed gear mechanism for bicycles, an axle, a wheel hub concentric with the axle, planetary transmission mechanism mounted on the axle at one end of the hub, an anti-friction bearing between said mechanism and said hub, a ball bearing for the outer side of said transmission mechanism, a cone for said bearing threaded on the axle, said cone carrying an external screw thread, an internally threaded element cooperating with the threads on said cone, a shifter axially movable to one position for low speed drive and to another position for high speed drive, said shifter having a connection with said internally threaded element permitting relative rotation but preventing relative axial movement, and manually operated means for imparting rotation to said internally threaded element.

4. In two-speed gear mechanism for bicycles, an axle, a wheel hub concentric with the axle, planetary transmission mechanism mounted on the axle at one end of the hub, an anti-friction bearing between said mechanism and said hub, a ball bearing for the outer side of said transmission mechanism, a cone for said bearing threaded on the axle, said cone carrying an external screw thread, an internally threaded element cooperating with the threads on said cone, and a shifter axially movable to one position for low speed drive and to another position for high speed drive, said shifter having a connection with said internally threaded element permitting relative rotation but preventing relative axial movement, said internally threaded element having a sheave for the reception of a cable by means of which the internally threaded element may be rotated upon said cone to effect movement of said shifter.

5. In two-speed gear mechanism for bicycles, an axle, a driver concentric with said axle to which driving force may be applied by the bicycle rider, a shifter for controlling said gear mechanism arranged to be rotated by said driver and having two operative positions spaced apart axially, an externally threaded element fixed upon said axle and an internally threaded element operatively associated therewith, said shifter and said internally threaded element being connected together to prevent relative movement axially but to permit relative rotation, said externally threaded element having a longitudinal groove therein, said shifter having a lug adapted to enter said groove when it comes into register therewith, and spring means settable to exert tension tending to impart rotation to said internally threaded element, whereby when said lug reaches said groove it enters the groove with a snap action and permits said tension to turn said screw means for moving said shifter axially.

6. In two-speed gear mechanism for bicycles, an axle, a driver concentric with said axle to which driving force may be applied by the bicycle rider, a shifter for controlling said gear mechanism arranged to be rotated by said driver and having two operative positions spaced apart axially, an externally threaded element fixed upon said axle and an internally threaded element operatively associated therewith, said internally threaded element carrying a sheave, said shifter and said internally threaded element being connected together to prevent relative axial movement and to permit relative rotation, said externally threaded element having a longitudinal groove therein, said shifter having a lug adapted to enter said groove when it comes into register therewith, a cable looped around said sheave and fastened thereto at one point, a spring attached to said cable adapted to be preset to exert tension thereupon, whereby when said lug reaches said groove it enters the groove with a snap action and permits said tension to turn said internally threaded element for moving said shifter axially.

7. In two-speed gear mechanism for bicycles, an axle, a driver concentric with said axle to which driving force may be applied by the bicycle rider, a planetary transmission comprising a planet gear carrier fixed with respect to said driver and having holes therein, a shifter movable axially for controlling said transmission comprising pins adapted when the shifter is in one position to enter said holes to lock the sun gear and planet carrier together, an externally threaded element fixed upon said axle, and an internally threaded element in cooperative relation therewith, said shifter and said internally threaded element being connected together to prevent relative axial movement and to permit relative rotation, and spring means settable to exert tension tending to impart rotation to said internally threaded element, whereby when said pins and said holes come into register the pins enter the holes with a snap action, locking the transmission in high.

8. In two-speed gear mechanism for bicycles, an axle, a driver concentric with said axle to which driving force may be applied by the bicycle rider, a planetary transmission comprising a planet gear carrier fixed with respect to said driver and having holes therein, a shifter movable axially for controlling said transmission comprising pins adapted when the shifter is in one position to enter said holes to lock the sun gear and planet carrier together, an externally threaded element fixed upon said axle, and an internally threaded element in cooperative relation therewith, said shifter and said internally threaded element being connected together to prevent relative axial movement and to permit relative rotation, said internally threaded element carrying a sheave, a cable looped around said sheave and fastened thereto at one point, a spring attached to said cable and adapted to be placed under tension tending to impart rotation to said internally threaded element, whereby when said pins and said holes come into register the pins enter the holes with a snap action, locking the transmission in high.

9. In two-speed gear mechanism for bicycles, an axle, a driver concentric with said axle to which driving force may be applied by the bicycle rider, a planetary transmission comprising a planet gear carrier fixed with respect to said driver and having holes therein and a sun gear, an externally threaded element fixed upon said axle and an internally threaded element in operative relation therewith, said externally threaded element having a longitudinal groove therein, a shifter for controlling said transmission having two axially spaced positions having pins adapted when the shifter is in one position to enter said holes and having a lug adapted when the shifter is in the other position to enter said groove, said shifter and said internally threaded element being connected toegther to prevent relative axial movement and to permit relative rotation, and spring means adapted to be preset to bias said internally threaded element for rotation in one direction or the other, whereby with said biasing means set for action in one direction when said pins and said holes come into register the pins enter the holes with a snap action, locking the transmission in high, and whereby with the biasing means set for action in the opposite direction when said lug comes into register with said groove the lug enters the groove with a snap action, locking the sun gear against rotation.

10. In two-speed gear mechanism for bicycles, an axle, a driver concentric with said axle to which driving force may be applied by the bicycle rider, a planetary transmission comprising a planet gear carrier fixed with respect to said driver and having holes therein and a sun gear, an externally threaded element fixed upon said axle and an internally threaded element in operative relation therewith, said externally threaded element having a longitudinal groove therein, a shifter for controlling said transmission having two axially spaced positions having pins adapted when the shifter is in one position to enter said holes and having a lug adapted when the shifter is in the other position to enter said groove, said shifter and said internally threaded element being connected together to prevent relative axial movement and to permit relative rotation, said internally threaded element carrying a sheave, a cable looped around said sheave and fastened thereto at one point, springs attached to the opposite ends of said cable, and means for selecting one of said springs to exert greater force than the other and place the cable under tension tending to rotate said internally threaded element in a given direction, whereby the pins enter the holes or the lug enters the groove, as the case may be, with a snap action.

ALVIN J. MUSSELMAN.